(12) United States Patent
Persson et al.

(10) Patent No.: US 9,678,781 B2
(45) Date of Patent: Jun. 13, 2017

(54) METHODS OF AND DATA PROCESSING SYSTEMS FOR HANDLING AN ACCELERATOR'S SCHEDULING STATISTICS

(71) Applicant: ARM Limited, Cambridge (GB)

(72) Inventors: Hakan Persson, Bjarred (SE); Matt Evans, Cambridge (GB); Jason Parker, Cambridge (GB); Marc Zyngier, Cambridge (GB)

(73) Assignee: ARM LIMITED, Cambridge (GB)

( * ) Notice: Subject to any disclaimer, the term of this patent is extended or adjusted under 35 U.S.C. 154(b) by 0 days.

(21) Appl. No.: 14/682,310

(22) Filed: Apr. 9, 2015

(65) Prior Publication Data
US 2015/0293775 A1    Oct. 15, 2015

(30) Foreign Application Priority Data

Apr. 9, 2014    (GB) .................................. 1406393.7

(51) Int. Cl.
*G06F 9/455*    (2006.01)

(52) U.S. Cl.
CPC .................... *G06F 9/45558* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS 7,644,407 B2 *  1/2010  Cowperthwaite ... G06F 9/45558
                                                         711/203
9,407,944 B1 *  8/2016  Galdy ................ H04N 21/2385
(Continued)

FOREIGN PATENT DOCUMENTS

EP    2437161 A1    4/2012
WO    2013178245 A1    12/2013
WO    2014031833 A1    2/2014

OTHER PUBLICATIONS

Search Report dated Oct. 27, 2014 in GB Patent Application No. GB1406392.9, 3 pages.
(Continued)

*Primary Examiner* — Wei Zhen
*Assistant Examiner* — Binh Luu
(74) *Attorney, Agent, or Firm* — Vierra Magen Marcus LLP (57) ABSTRACT

A data processing system comprises one or more processors that each execute one or more operating systems. Each operating system includes one or more applications. The system also comprises an accelerator that provides a shared resource for a plurality of the applications, an input/output module comprising one or more input/output interfaces for the submission of tasks to the accelerator, a hypervisor that manages the allocation of the input/output interfaces to the one or more operating systems and a storage area accessible by the hypervisor and the accelerator. The accelerator is capable of writing one or more selected pieces of information representative of one or more scheduling statistics of the accelerator periodically to the storage area without having received a request for the one or more selected pieces of information from the hypervisor.

26 Claims, 2 Drawing Sheets

(56) References Cited

U.S. PATENT DOCUMENTS

| | | | |
|---|---|---|---|
| 2003/0026277 A1* | 2/2003 | Pate | H04L 47/32 370/412 |
| 2007/0052715 A1 | 3/2007 | Levit-Gurevich et al. | |
| 2012/0084774 A1 | 4/2012 | Post et al. | |
| 2013/0185722 A1* | 7/2013 | Kruglick | G06Q 10/063 718/1 |
| 2014/0096132 A1* | 4/2014 | Wang | G06F 9/45533 718/1 |
| 2015/0026687 A1* | 1/2015 | Yim | G06F 11/3476 718/102 |
| 2015/0256609 A1* | 9/2015 | Morton | H04L 29/08072 715/719 |
| 2015/0261550 A1* | 9/2015 | Kruglick | G06Q 30/0613 705/26.41 |

OTHER PUBLICATIONS

Search Report dated Oct. 30, 2014 in GB Patent Application No. GB1406400.0, 3 pages.

Gupta et al. "GViM: GPU-accelerated Virtual Machines," 3rd Workshop on System-level Virtualization for High Performance Computing (HPCVirt09), Nuremberg, Germany, Association for Computing Machinery (ACM), Mar. 31, 2009, 8 pages.

Kadav et al. "Live Migration of Direct-Access Devices" Association for Computing Machinery (ACM), Jul. 2009, 7 pages.

Le Vasseur et al. "Standardized but Flexible I/O for Self-Virtualizing Devices" WIOV'08 Proceedings of the First conference on I/O virtualization, USENIX Association, Berkeley, CA Dec. 10, 2008, 7 pages.

Raj et al. "Self-Virtualized I/O: High Performance, Scalable I/O Virtualization in Multi-core Systems" Georgia Institute of Technology, [retrieved from http://cercs.gatech.edu/tech-reports/tr2006/git-cercs-06-02.pdf], 2006, 23 pages.

Zhai et al. "Live Migration with Pass-through Device for Linux VM" Proceedings of the Linux Symposium, vol. Two, Ottawa, Ontario, Canada, Jul. 23-26, 2008, 9 pages.

Search Report dated Oct. 27, 2014 in GB Patent Application No. GB1406393.7, 3 pages.

* cited by examiner

METHODS OF AND DATA PROCESSING SYSTEMS FOR HANDLING AN ACCELERATOR'S SCHEDULING STATISTICS

BACKGROUND

The technology described herein relates to data processing systems in which an accelerator, such as a graphics processing unit (GPU), a video accelerator or a digital signal processor, etc., acts as a common shared resource for a plurality of applications (such as games, productivity applications, browsers, etc.) and in particular to a method and data processing system for handling the accelerator's scheduling statistics.

In a virtualised data processing system, including multiple virtual machines, in order to provide hardware access to a virtualisation aware device, e.g. an accelerator, a hypervisor is usually used to manage the allocation of a number of input/output interfaces to the virtual machines which require access to the resources of the accelerator. In order to manage the allocation of the input/output interfaces the hypervisor needs to have access to scheduling statistics—information regarding the frequency and duration of tasks submitted to and running on the accelerator, for example, so that it can best schedule the submission of future tasks to the accelerator. Such information is particularly required by the hypervisor when there are more virtual machines wishing to submit tasks than the accelerator has capacity to manage simultaneously, e.g. owing to a hardware limit on the number of input/output interfaces. Thus access to the accelerator must be time shared by the virtual machines, and the use of the scheduling statistics helps to optimise this time sharing.

In conventional systems the scheduling statistics are requested by the hypervisor from the accelerator when they are needed, e.g. prior to the initialisation of an input/output interface for a virtual machine to connect to the accelerator. The hypervisor submits a request command to the accelerator which responds with the requested scheduling statistics. The requested types of scheduling statistics may be different each time, e.g. depending on the nature of the virtual machine requesting access to the accelerator.

The Applicants believe that there remains scope for improved methods and systems for providing scheduling information in data processing systems.

BRIEF DESCRIPTION OF THE DRAWINGS

A number of embodiments of the technology described herein will now be described, by way of example only, and with reference to the accompanying drawings, in which.

DETAILED DESCRIPTION

One embodiment of the technology described herein comprises a method of operating a data processing system that comprises:

one or more processors that each execute one or more operating systems, each operating system including one or more applications;

an accelerator that provides a shared resource for a plurality of the applications;

one or more input/output interfaces for the submission of tasks to the accelerator;

a hypervisor that manages the allocation of the input/output interfaces to the one or more operating systems; and a storage area accessible by the hypervisor and the accelerator;

the method comprising:

periodically writing one or more selected pieces of information representative of one or more scheduling statistics of the accelerator to the storage area without having received a request for the one or more selected pieces of information from the hypervisor.

Another embodiment of the technology described herein comprises a data processing system comprising:

one or more processors that each execute one or more operating systems, each operating system including one or more applications;

an accelerator that provides a shared resource for a plurality of the applications;

one or more input/output interfaces for the submission of tasks to the accelerator;

a hypervisor that manages the allocation of the input/output interfaces to the one or more operating systems;

a storage area accessible by the hypervisor and the accelerator;

wherein the accelerator is arranged to write one or more selected pieces of information representative of one or more scheduling statistics of the accelerator periodically to the storage area without having received a request for the one or more selected pieces of information from the hypervisor.

The data processing system of the technology described herein has an accelerator which, without being prompted by hypervisor, writes out scheduling statistics information to a storage area that can be accessed by both the hypervisor and the accelerator, i.e. scheduling statistics information is provided upfront by the accelerator, where it can be read by the hypervisor for use in allocating the input/output interfaces to the one or more operating systems (i.e. the virtual machines which generally have a single operating system each). The provision of the scheduling information is thus automatic for each instance of the one or more selected pieces of information being written out to the storage area. Generally, the accelerator and the hypervisor will both have permission to write to and read from the storage area.

By periodically writing out scheduling statistics to the storage area, i.e. a shared memory location accessible by at least the hypervisor and the accelerator, these are available to the hypervisor whenever it wants them and without waiting, i.e. the hypervisor does not need to send a specific request to the accelerator each time for this information. The effect of this then is that the technology described herein can significantly reduce the time taken to obtain the scheduling information and thus comprise a more efficient data processing system. For example, the time for sending a scheduling information request and waiting for the response could take of the order of 100 μs. Reading the desired information from the storage area without first having to request it will take of the order of 100 ns, approximately three orders of magnitude quicker than was previously possible.

The Applicants have further recognised that reducing any latency in obtaining and using scheduling statistics in data processing systems that use shared resources is likely to be more important and desirable in the future. This is because it is becoming increasingly common to have systems in which the agent that controls the system (and thus that uses the scheduling statistics) is not directly involved in each task being performed by a shared accelerator. This can arise, e.g., where there is direct communication between a guest OS (operating system) instance of a virtual machine and the shared accelerator or between a user mode process and the shared accelerator. In these cases, more significant (and thus undesirable) delays can arise when the hypervisor needs to request the scheduling statistics when it requires them. The technology described herein helps to avoid this.

The Applicants further believe that these issues and the need to address them have not previously been recognised as being significant because, for example, in existing systems in which virtualisation takes place on a network card, thus providing a direct communication channel between the operating system (virtual machine) and the accelerator, scheduling information is of limited use because the connection between the operating system (virtual machine) and the accelerator is fixed, and so each incoming task will be guaranteed to be executed (and so the issue of needing to provide scheduling information more efficiently does not arise). Similarly in existing systems in which direct communication is provided between a user mode process and a hardware device as implemented in game consoles and personal computer graphics cards, for example, generally only a single application requires access to the accelerator and tasks can be co-operatively scheduled, thereby again meaning that scheduling information is of limited use.

The one or more selected pieces of information are selected in the sense that the type of information, i.e. the field or variable, which is written out, is chosen from one or more known fields or variables that the accelerator can provide which are representative of its scheduling statistics (but the value of each of the pieces of information will not be known until it is written out). The particular pieces of information written out could be selected depending on particular circumstances, e.g. if the information is written out at regular intervals and/or if it is written out as a result of a trigger from other events in the system, as will be discussed further below. Furthermore, the one or more selected pieces of information could be selected to differ depending on the type of trigger that causes the information to be written out. The one or more selected pieces of information could also differ depending on the time at which they are written out. For example, certain pieces of information may not be written out every time the information is written out, but only be written out every n-th time.

In one set of embodiments the fields and/or variables of the selected pieces of information are determined in advance and the same set of information is provided each time the one or more selected pieces of information are written out, albeit with the current value for each of the fields and/or variables at the time at which the information is written out. Thus in this set of embodiments the system is arranged to write out these one or more selected pieces of information, and the system knows which pieces of information it is going to write out, but the value of the various fields or variables is not known until it is written out, e.g. because they may vary with time depending on the state of the accelerator.

The accelerator may be any suitable accelerator (execution/functional unit) that can provide a common resource to an application. It could, for example, comprise a graphics processing unit (GPU), an encryption accelerator, a video accelerator, a network (processing) interface, a digital signal processor (DSP), audio hardware, etc. The accelerator can essentially comprise any component that is optimised for a particular task. In one set of embodiments it comprises a graphics processing unit. The system may comprise only a single accelerator, though embodiments are envisaged in which the system comprises a plurality of accelerators.

The accelerator should, and in an embodiment does, comprise at least an execution unit (a functional unit) that is operable to perform tasks for applications. In an embodiment it also includes a task scheduler. In an embodiment, the accelerator also includes the input/output interfaces for the submission of tasks to the accelerator. Thus, in an embodiment, the accelerator comprises an execution unit, a task scheduler, and the input/output interfaces. Other arrangements would, of course, be possible.

In one embodiment, each input/output interface for the accelerator comprises a set of one or more registers that can (and that are to be used to) store information (data) that is to be used to dispatch tasks to the accelerator.

The one or more selected pieces of information representative of the scheduling statistics from the accelerator could be written out to the storage area at a regular (e.g. fixed) interval, e.g. once every 0.001-0.05 s, in an embodiment once every 0.005-0.01 s, i.e. at a rate of 20-1000 Hz, in an embodiment at a rate of 100-200 Hz. The interval could be determined by reference to the accelerator's clock (or equally another system reference time-base or time reference mechanism), i.e. in units of the number of cycles of the clock. In one particular example, the accelerator has a frequency of 500 MHz and the interval is determined in units of 65536 ($2^{16}$) clock cycles in order to achieve a particular rate of writing out the selected pieces of information.

Alternatively or additionally, the information could be written out following a particular event occurring in the system, e.g. when a task is started or completed or some other significant event occurs. One example of a significant event is when the accelerator encounters a page fault, as this may cause one task running on the accelerator to be suspended and another task to be processed. Another example is the start of a display refresh. Commonly the display refresh rate is fixed, but could be variable, e.g. to reduce power or to reduce animation jitter when the system is under heavy load.

Thus the provision of the information to the storage area may be triggered by events in the system which, for example, have the ability to cause a change to the scheduling statistics, i.e. the provision of the scheduling statistics is done intelligently. Therefore in one set of embodiments the accelerator is arranged to detect the occurrence of one or more particular events in the data processing system, and write out one or more selected pieces of scheduling information following the detection of the one or more particular events.

It will be appreciated in this regard that the scheduling information is written out to the storage area automatically such that there is not (and does not need to be) a specific request from the hypervisor (e.g.) in advance of and for each instance that the scheduling information is written out. However, there may be, e.g., an initialisation command from the, e.g. hypervisor, that instructs the accelerator to start its automatic operation (and the technology described herein does not exclude this). However, once initialised, the accelerator will then periodically write out the scheduling information without first needing to receive any prompt or request therefor from the hypervisor.

Furthermore, the automatic provision of the scheduling information by the technology described herein does not preclude the hypervisor also making one or more additional, specific, requests for scheduling information from the accelerator, e.g. when specific pieces of information not present in the one or more pieces of selected information automatically provided are required for certain tasks.

In one set of embodiments the method comprises writing one or more selected pieces of information representative of one or more scheduling statistics of the accelerator to the storage area using a non-blocking process, e.g. a lock free process (though wait-free and obstruction-free processes could alternatively be used). This means that the hypervisor and/or the one or more operating systems always have read access to scheduling information in the storage area (are never "blocked" from reading the scheduling information in the storage area by the process of writing scheduling information to the storage area). This ensures that the hypervisor and/or the one or more operating systems can access the scheduling information automatically and at any time, i.e. efficiently and concurrently, when they require it. For example, the control for the dynamic voltage and frequency scaling of the accelerator may be completely separate from the scheduling of the one or more input/output interfaces to the one or more operating systems, but they may use, and therefore require access to, the same scheduling information Another embodiment of the technology described herein comprises a method of operating a data processing system that comprises:

one or more processors that each execute one or more operating systems, each operating system including one or more applications;

an accelerator that provides a shared resource for a plurality of the applications;

one or more input/output interfaces for the submission of tasks to the accelerator;

a hypervisor that manages the allocation of the input/output interfaces to the one or more operating systems; and a storage area accessible by the hypervisor and the accelerator;

the method comprising:

periodically writing one or more selected pieces of information representative of one or more scheduling statistics of the accelerator to the storage area, the writing process being such that the writing of the pieces of information to the storage area does not prevent the reading of stored scheduling statistics information from the storage area while the pieces of information are being written to the storage area.

Another embodiment of the technology described herein comprises a data processing system comprising:

one or more processors that each execute one or more operating systems, each operating system including one or more applications;

an accelerator that provides a shared resource for a plurality of the applications;

one or more input/output interfaces for the submission of tasks to the accelerator;

a hypervisor that manages the allocation of the input/output interfaces to the one or more operating systems;

a storage area accessible by the hypervisor and the accelerator;

wherein the accelerator is arranged to write one or more selected pieces of information representative of one or more scheduling statistics of the accelerator periodically to the storage area and in such a way that the writing of the pieces of information to the storage area does not prevent the reading of stored scheduling statistics information from the storage area while the pieces of information are being written to the storage area.

In one set of embodiments, the "non-blocking" writing process is achieved by writing out the next set of one or more selected pieces of scheduling information to a different location in the storage area than the location to which the previous version of the one or more selected pieces of information was written out. If the scheduling statistics information was only written out to a single location in the storage area then this could become inaccessible (i.e. "locked") when the most recent version of the information is being written out (over-writing the previous version), whereas providing multiple versions of the scheduling information in different memory locations allows the hypervisor to access at least an historic version of the information if the most recent information is in the process of being written out.

Different versions of the one or more selected pieces of information could be provided at two different locations in the storage area, however in an embodiment the information is provided at three or more different locations in the storage area, in order to facilitate lock free access of the information. Conveniently, in one set of embodiments the storage area comprises a circular memory buffer. In such a buffer the oldest entry, i.e. the oldest version of the scheduling statistics, is overwritten with the newest entry, i.e. the most recent version of the scheduling statistics.

Generally the number of entries in the circular buffer will be chosen to be equal to the number of versions required to be stored. In general the storage area will comprise a finite number of different locations to which the information can be written out, e.g. the storage area may comprise a four entry circular memory buffer. Thus in an embodiment, the most recent version of the information will be written over the oldest version of the information, i.e. the different locations will be used in a cycle to store the information.

The storage area could be provided in one place, e.g. with the multiple locations provided as different areas within this single physical area, or the storage area could be provided in multiple places within the system, i.e. with the multiple locations provided at different physical places within the system.

In the set of embodiments in which multiple versions of the one or more selected pieces of information are provided, the hypervisor could simply select an available version of the scheduling information at random. However it will be appreciated that the system will be operated more efficiently if the hypervisor selects the most recent version of the information. Thus in an embodiment, the hypervisor is arranged to determine if the scheduling information has been updated, e.g. if the scheduling information has been modified during a set time period. This could be achieved as desired, e.g. by comparing the scheduling information held at a particular time against the scheduling information held at an earlier time, but in an embodiment the most recent (and in an embodiment also the oldest) version of the scheduling information is indicated and identifiable.

This may be achieved as desired, for example, and in one set of embodiments each set of one or more selected pieces of scheduling information that is written out is associated with (and in an embodiment includes) an identifier which is representative of its version. The identifier could comprise a sequence number or a pointer or pointers could be set and used to indicate the most recent (and oldest) versions of the scheduling information. In an embodiment the identifier is associated with the particular version of the scheduling information, e.g. the sequence number is written out, or the pointer is set, after the rest of the information is written out. In an embodiment the hypervisor then uses the identifiers to determine the most recent version of the scheduling information. In an embodiment the sequence number is generated by a counter that increments the sequence number each time a set of scheduling information is written out. When pointers are being used to indicate the different versions of the scheduling information, in an embodiment these are updated each time a set of scheduling information is written out, e.g. by updating the pointers to the beginning and end of the circular memory buffer (identifying the oldest and most recent versions respectively).

Thus in one set of embodiments the method comprises the step of the hypervisor identifying the most recent version of the one or more selected pieces of scheduling information, e.g. using sequence numbers or a pointer, and reading the so identified most recent version of the one or more selected pieces of the scheduling information. In an embodiment the method also includes the steps reading, using the hypervisor, the identifiers associated with different versions of the one or more selected pieces of information, determining, using the hypervisor, the most recent identifier, and reading, using the hypervisor, the scheduling information associated with the most recent identifier.

Alternatively or additionally, in order to provide a check of the information associated with an identifier, e.g. sequence number (or pointer), in one set of embodiments the identifier associated with the one or more selected pieces of scheduling information being read out, is read out before and after the one or more selected pieces of scheduling information is read out, and the identifiers are compared to check that the one or more selected pieces of scheduling information has not been updated during the read process. When the identifier has changed, in an embodiment the one or more selected pieces of scheduling information is discarded and not used (because it will no longer be the most recent version of the information that has been written out, or, when the scheduling information has been updated during the read process, may not all correspond to the same version of the scheduling information written out (and thus likewise should be discarded). When a particular set of scheduling information is discarded, in an embodiment a further attempt is made to read the scheduling information, e.g. until the scheduling information is read successfully.

In one set of embodiments there is a time limit for the hypervisor to read the one or more selected pieces of scheduling information from the storage area, which may be based on the time needed to read the identifier and determine the most recent identifier and the one or more selected pieces of scheduling information associated with it, in the embodiments which comprise an identifier. In an embodiment, when the time limit is exceeded, the reading of the one or more selected pieces of information by the hypervisor is aborted or when the scheduling information is read, it is ignored. The time limit could be set such that it is unlikely a new set of scheduling information is written out during the reading of the information. Thus the identifiers are used to identify which set of the scheduling information is the most recent, and a maximum time is allowed for reading the information to ensure the data is read in a consistent manner.

Alternatively or additionally, a check could be made of the scheduling information after it has been read to make sure it is still valid, e.g. using the identifiers (sequence numbers or pointers) as described above, and when it is not valid then in an embodiment the scheduling information is read again, e.g. this could be repeated until the scheduling information has been read successfully. When a strict time limit is not employed, e.g. the best effort is made to read the data in a timely manner, a new set of scheduling information could be written out during the reading of the data such that the data read out may not all correspond to the same version of the scheduling information written out. The check of the scheduling information is then performed at the end of the time limit to confirm the data read out is valid, and when it is not valid then in an embodiment the scheduling information is read again, e.g. this could be repeated until the scheduling information has been read successfully.

Having a time limit for the hypervisor to read the scheduling information successfully may reduce the latency of the method, prevent the scheduling information becoming locked when the hypervisor gets stuck while reading out the scheduling information, and allow further requests for the scheduling information to be processed quickly, e.g. because the scheduling information may be locked while it is being read, so no further read requests can be processed and a subsequent version of the scheduling information cannot be written out to that location in the storage area until the location becomes unlocked.

In an embodiment the time limit is less than or equal to $(x-1)*(T\_update)$, where $T\_update$ is the time interval between successive sets of scheduling information being written out, and $x$ is the number of locations to which the scheduling information is written out, i.e. when only two locations are provided then the limit is less than or equal to the interval period and increases when more locations in the storage area are provided.

In an embodiment the one or more selected pieces of information representative of the accelerator's scheduling statistics comprise information related to the accelerator as a whole, e.g. to the overall use of the accelerator by the one or more operating systems (virtual machines) connected thereto, as well as information related to each virtual machine connection to the accelerator, e.g. more detailed information for each of the individual virtual machine connections. Furthermore, the information may be historic, i.e. relating to what has happened to the accelerator up to or at the point the statistics are provided, or it may be predictive, i.e. giving clues to the future behaviour of the accelerator. The predictive information could, for example, predict the workload of the accelerator, as well as for each of the virtual machines connected thereto, and heuristics could be used to quantify how much pending work there is, i.e. tasks waiting to be submitted by the virtual machines.

In an embodiment the one or more selected pieces of information relating to the accelerator as a whole comprise one or more of: the instantaneous usage (i.e. at the time the scheduling information is written out) of the accelerator by all the operating systems (virtual machines) connected thereto, the power consumption of the accelerator (historic and/or predictive), and error messages that may be present. The usage of the accelerator by all the virtual machines connected thereto could be indicated by one or more of: the number of idle periods of the accelerator, the number of internal power domain cycles of the accelerator, the number of clock cycles of the accelerator and the number of active clock cycles of the accelerator, though of course this list is not exhaustive.

In an embodiment the one or more selected pieces of information relating to each operating system (virtual machine) connected to the accelerator comprise one or more of: the state of each of the virtual machine input/output interfaces, e.g. whether they are in use or not, the individual instantaneous usage of the accelerator by each of the virtual machines connected thereto, the duration of time (up until the information is written out) that each of the virtual machines has been connected to the accelerator, e.g. represented by the number of accelerator clock cycles used by tasks from each operating system (virtual machine), the number of runable tasks, e.g. fragment task, vertex task or compute task, each virtual machine has that are being blocked from the accelerator by tasks from other virtual machines, the presence of tasks that are currently suspended on the accelerator, the duration for which the suspended tasks have been suspended, error messages that may be present, the state of communication between each of the virtual machines and the accelerator, e.g. any pending commands or messages, any heuristics information, e.g. regarding the contention between virtual machines for task execution on the accelerator. These are all historic pieces of information. In an embodiment predictive pieces of information relating to each virtual machine connection to the accelerator comprise one or more of: whether or not each virtual machine has any active tasks, whether or not each virtual machine has any pending commands or tasks, whether or not the virtual machine has any soft stopped tasks, and whether or not each virtual machine has any pre-empted tasks.

The one or more selected pieces of information relating to the accelerator as a whole could be written out separately from, or at the same time as, the one or more selected pieces of information relating to each operating system (virtual machine) connected to the accelerator. For example, a command could be issued by the accelerator to write out the one or more selected pieces of information relating to the accelerator as a whole and a separate command could be issued by the accelerator to write out the one or more selected pieces of information relating to each virtual machine connected to the accelerator. These commands could be issued at the same time and at the same frequency, or at different times and/or different frequencies.

The type of the one or more selected pieces information, i.e. the fields or variables, may depend on or relate to the type of the accelerator, e.g. when the accelerator is a GPU or a video accelerator. For example, when the data processing system comprises a video accelerator, in an embodiment the rate at which the information is written out to the storage area is related to the frame rate of the video the system is processing, e.g. the information could be provided for each frame.

The one or more selected pieces of information could comprise data in the format of continuous or discrete variables with a range of values, e.g. in the case of the usage of the accelerator by the virtual machines, or it could comprise data in the form of flags, e.g. a one bit value, which could be used to indicate when each of the input/output interfaces for the virtual machines are in use, for example.

Further selected pieces of information could be written out, as will be apparent to the skilled person. Furthermore the one or more selected pieces of information could be used by themselves, or with other of the one or more selected pieces of the information, to infer or deduce further information representative of the scheduling statistics of the accelerator, either for each version of the information or over multiple versions, e.g. averages or trends of the pieces of information.

The scheduling statistics that are written to the storage area can be used in the system as desired. In an embodiment they are read by the hypervisor, with the hypervisor then using that information to, e.g., and in an embodiment, then control and/or schedule the submission of tasks to the accelerator, and/or to control and/or schedule access to the accelerator by applications, respective operating systems (virtual machines), etc.

As will be apparent to the skilled person, the one or more selected pieces of information representative of the scheduling statistics could be used for a whole variety of tasks, as they would presently be used in such a data processing system. However, because access to the scheduling statistics is quick and easy, using the technology described herein, this allows the information to be used in ways which were not contemplated previously. For example, the connection of the one or more operating systems (virtual machines) to the accelerator can be managed dynamically by the hypervisor, with the scheduling statistics being used to determine whether the hypervisor can stop a current process and create a new one. This could be done by looking at the scheduling statistics regarding for how long each of the virtual machines connected to the accelerator has been idle, and removing a virtual machine which has been idle for more than a certain length of time, e.g. 0.5 s, such that a new virtual machine wishing to submit tasks to the accelerator can be connected by the hypervisor.

Thus, in an embodiment, the hypervisor uses the scheduling information to (dynamically) manage the connection of virtual machines to the accelerator.

The dynamic management of the connection of the one or more operating systems (virtual machines) to the accelerator by the hypervisor may result in a virtual machine being disconnected from the accelerator while a task is mid-operation, e.g. when the task had become idle and a virtual machine waiting to run pending task of higher priority had been connected in its place. Thus in one set of embodiments the hypervisor is arranged to save the state of the virtual machine it has disconnected to memory. This allows the task being run by the virtual machine to be resumed and completed once there are available resources on the accelerator. The priority of running and pending tasks could be determined from the scheduling statistics by the hypervisor. Alternatively, running and pending tasks could generate their own priorities which could then be read by the hypervisor and compared.

Another use of the scheduling statistics may be to determine the optimum DVFS (dynamic voltage and frequency scaling) point at which to operate the accelerator in order to minimise its power consumption. The power consumption of an accelerator is generally proportional to the frequency and also to the square of the voltage at which it is being used. Therefore if these can be reduced, without significantly harming the processing performance of the accelerator, the power consumed can be reduced, the amount of cooling needed can be reduced and the lifetime of the accelerator can be extended. In particular, the usage of the accelerator by the one or more operating systems (virtual machines), i.e. the fraction of time a resource was used, can be used to control the frequency of the accelerator, for example, thus affecting the future available capacity of the accelerator. For example, when the scheduling statistics show that the usage of the accelerator is low, the frequency can be reduced such that the accelerator still performs at an acceptable level, i.e. giving enough processing capacity to the virtual machines that are connected thereto, while minimising its power consumption.

Other factors, such as the temperature of the accelerator, the frequency of other parts of the data processing system, etc., may also be used to influence the choice of frequency for the accelerator.

As discussed above, in a system or method of any embodiments of the technology described herein, the hypervisor could still request scheduling information from the accelerator separate from the automatic provision of the scheduling information. This may happen when the hypervisor and/or the one or more operating systems require specific information that is not part of the one or more pieces of selected information that are provided automatically.

Furthermore, a command may be issued, e.g. by the hypervisor following initialisation of the accelerator, to start providing the scheduling information automatically. This command, as part of the initialisation of the system, may include the location of the storage area, i.e. where the accelerator is to write out the scheduling information, a command to start the accelerator clock or to synchronise the writing out of the scheduling information to the accelerator clock, e.g. when the period between successive writing out of the scheduling information is based on cycles of the accelerator clock, and/or a command to reset the counter for the version of the scheduling information.

The technology described herein can be implemented in any suitable system, such as a suitably configured microprocessor based system. In an embodiment, the technology described herein is implemented in a computer and/or micro-processor based system.

The data processing system may also comprise, and in an embodiment does also comprise, and/or is in communication with, one or more memories and/or memory devices that store the data described herein, and/or that store software for performing the processes described herein. The data processing system may also be in communication with a host microprocessor, and/or with a display for displaying images based on the data described above, and/or with a graphics processor for processing the data described above.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

It will also be appreciated by those skilled in the art that all of the described embodiments of the technology described herein can, and in an embodiment do, include, as appropriate, any one or more or all of the features described herein.

The methods of the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a data processing system, processor, or microprocessor system comprising a data processor causes in conjunction with said data processor said processor, or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may be embodied as a computer program product for use with a computer system. Such an implementation may comprise a series of computer readable instructions fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Figure 1:
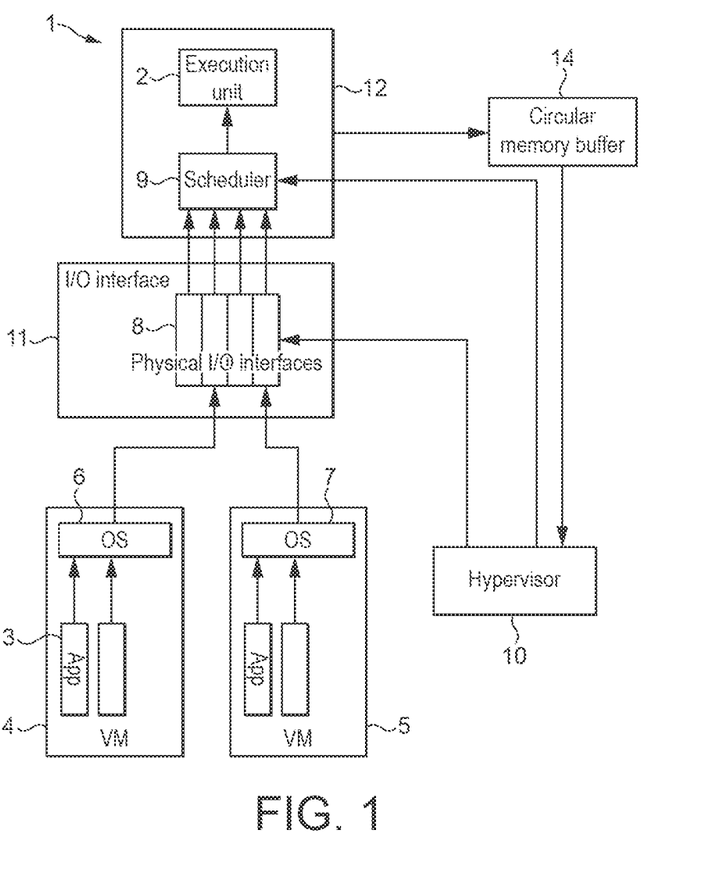
FIG. 1 shows schematically an embodiment of a data processing system in which an accelerator acts as a shared resource for a plurality of applications.

FIG. 1 shows schematically a data processing system 1 in which an accelerator 12 that comprises an execution unit 2 and a scheduler 9 acts as a common shared resource for plural applications (app) 3 executing on respective virtual machines (VM) 4, 5. (As shown in FIG. 1, and as will be appreciated by those skilled in the art, each virtual machine 4, 5 comprises a respective operating system (OS) 6, 7 that is executing on a common processor to provide the "virtual machine", and there are respective applications 3 operating within each operating system (virtual machine) that will then use the execution unit 2 as a resource.)

In order to allow the applications to use the execution unit 2 to perform tasks, the execution unit 2 has an associated input/output interface module 11 comprising one or more associated input/output interfaces 8 for submitting tasks to the execution unit 2 (and thus to the accelerator 12) and that the respective operating system 6, 7 can store information needed by the execution unit 2 in when the execution unit 2 (the accelerator) is to perform a task for a given application. FIG. 1 shows a system with four sets of input/output interfaces 8, although other arrangements would, of course, be possible. As shown in FIG. 1, when an application wishes to use the execution unit 2 to perform a task, it will access a set of the input/output interfaces 8 of the execution unit 2 via its respective operating system 6, 7.

FIG. 1 also shows a scheduler 9 that acts to arbitrate between and schedule tasks in the input/output interfaces 8. As shown in FIG. 1, the system will also include a hypervisor 10 that interfaces between the respective virtual machines (operating systems) 4, 5 and the input/output interfaces 8 of the accelerator (execution unit) 12.

The hypervisor 10 and the accelerator 12 are also connected to a circular memory buffer 14. The accelerator 12 is arranged to write out scheduling statistics to the circular memory buffer 14 and the hypervisor 10 is arranged to read the scheduling statistics from the circular memory buffer 14, as will be explained in more detail below. The circular memory buffer 14 has four entries 15, 16, 17, 18 which are capable of storing the previous four versions of the scheduling statistics. When the most recent version of the scheduling statistics is written out from the accelerator 12 to the circular memory buffer 14, it is written to the entry 15, 16, 17, 18 in the circular memory buffer 14 containing the oldest version of the scheduling statistics, and the pointers to the beginning and end of the circular memory buffer 14, i.e. to the oldest and most recent versions of the scheduling statistics respectively, are updated.

The accelerator 12 typically runs at a frequency of 500 MHz, for example, and is arranged to write out scheduling statistics periodically to the circular memory buffer 14, with the interval between writing out the scheduling statistics being specified in units of 65536 (216) cycles of the accelerator 12. For example, with an accelerator 12 having a frequency of 500 MHz and writing out once every 64 units of 65536 cycles of the accelerator 12 gives a frequency of writing out the scheduling statistics of approximately 120 Hz.

Figure 2:
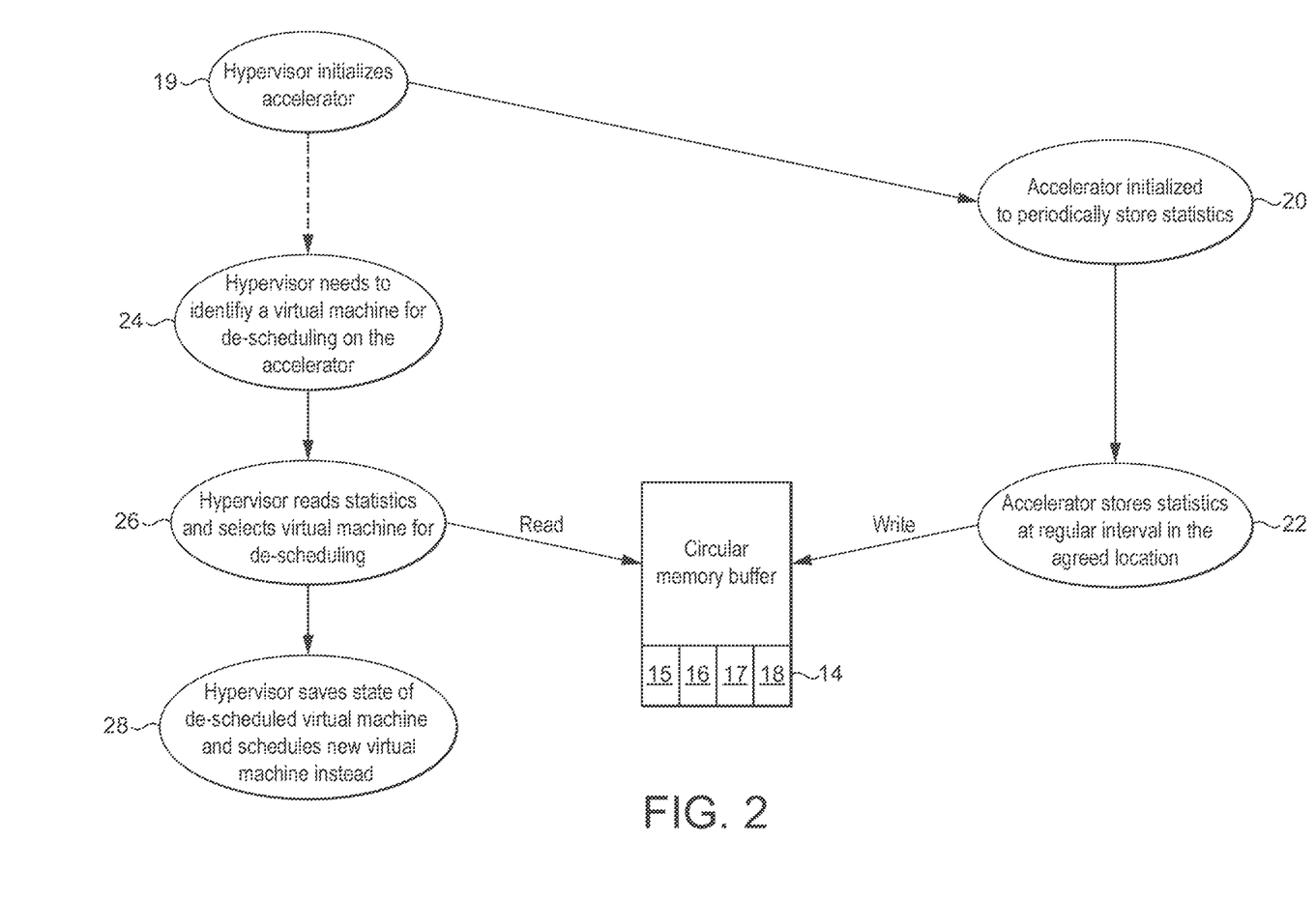
FIG. 2 shows operation of an embodiment of the data processing system.

FIG. 2 shows a flow chart for operation of the data processing system 1. Operation of the data processing system 1 will now be described with reference to the components shown in FIG. 1 and the steps shown in FIG. 2.

At some point following starting operating of the data processing system 1 shown in FIG. 1, e.g. when it is powered on, the hypervisor 10 initialises the accelerator 12 (step 19, FIG. 2). The details of this initialisation are known to the skilled person and their specifics are not of particular relevance to the technology described herein. As a final part of the initialisation of the accelerator 12, a command is issued on the accelerator 12 to start writing out periodically the sets of data representative of scheduling statistics for the accelerator 12 as a whole, and the sets of data representative of scheduling statistics for each of the virtual machines 4, 5 connected to the accelerator 12 at each determined interval (step 20, FIG. 2). This step also includes identifying the location of the circular memory buffer 14 to the accelerator 12 for it to write out the scheduling statistics, starting the accelerator clock to determine the interval between writing out each set of the scheduling statistics, and starting the counter for the sequence number of the scheduling statistics.

Once the accelerator 12 has been issued with the command to start writing out the scheduling statistics (step 20, FIG. 2), at each interval, determined by the number of cycles that have elapsed on the accelerator clock, the accelerator 12 then writes out the data representative, at that point in time, of the scheduling statistics to the entry 15, 16, 17, 18 at the beginning of the circular memory buffer 14 (indicated by a pointer) (step 22, FIG. 2), pointers to the beginning and end of the circular memory buffer 14 being updated accordingly.

When pointers are not being used to identify the most recent version of the scheduling statistics, when writing out the scheduling statistics, the accelerator 12 writes an accompanying sequence number to the circular memory buffer 14, to allow the most recent version of the scheduling statistics to be identified. The counter then increments the sequence number for the next set of scheduling statistics.

The scheduling statistics for the accelerator 12 as a whole include one or more of: the number of accelerator idle periods, the number of accelerator internal power domain cycles, the number of clock cycles, the number of active clock cycles, and an array for the scheduling statistics for each of the virtual machines 4, 5. The scheduling statistics for each of the virtual machines 4, 5 include one or more of: a flag indicating the general state of the virtual machine input/output interfaces 8, a flag indicating if each virtual machine input/output interface 8 has an active task, a flag to indicate if each virtual machine input/output interface 8 has a pending command or task, a flag to indicate if each virtual machine input/output interface 8 has a soft stopped task, a flag to indicate if each virtual machine input/output interface 8 has a pre-empted task, a flag to indicate if each virtual machine input/output interface 8 has a pending response from the accelerator 12 to the virtual machine 4, 5, the number of cycles with a running fragment task, the number of cycles with a running vertex or compute task, the number of cycles with a runable fragment task blocked by another virtual machine 4, 5, and the number of cycles with a runable vertex or compute task blocked by another virtual machine 4, 5 (of course this list is not exhaustive and alternative or additional scheduling statistics may be provided).

Once the scheduling statistics have been written out to the circular memory buffer 14 by the accelerator 12, they are available to be read by the hypervisor 10. As explained above, during operation of the data processing system 1, the hypervisor 10 will connect virtual machines 4, 5 to the accelerator 12 via input/output interfaces 8 so that applications 3 running on operating systems 6, 7 on the virtual machines 4, 5 can submit tasks for execution on the accelerator's execution unit 2. Depending on the relative priority of the tasks being run on the accelerator 12 from certain virtual machines 4, 5, as well as pending tasks wishing to be submitted to the accelerator 12 by other virtual machines 4, 5, the hypervisor 10 may wish to swap the virtual machines 4, 5 connected to the accelerator 12 in order to increase the overall efficiency of the running and pending tasks on the accelerator 12.

Thus the hypervisor 10 first needs to identify a virtual machine 4, 5 currently connected to the accelerator 12 to disconnect (step 24, FIG. 2). The hypervisor 10 does this by reading the most recent version of the scheduling statistics from the circular memory buffer 14 (by first using the pointers or the sequence number accompanying each version of the scheduling statistics to identify the most recent version, and by being blocked from reading scheduling statistics which are not the most recent version) and identifies, using the scheduling statistics, if there are any virtual machines 4, 5 currently connected to the accelerator 12 which are idle, for example, and thus have a lower priority than any pending tasks on virtual machines 4, 5 waiting to be connected to the accelerator 12 (step 26, FIG. 2).

A time limit (less than or equal to (x−1)*(T_update), where T_update is the time interval between successive sets of scheduling information being written out, and x is the number of locations to which the scheduling information is written out) is set for the hypervisor 10 to read the scheduling statistics from the circular memory buffer 14, including the time for reading the sequence number and determining the most recent sequence number and the one or more selected pieces of scheduling information associated with it. When the time limit is exceeded, the reading of the scheduling statistics by the hypervisor 10 is aborted and step 26 is repeated.

The hypervisor 10 then selects the virtual machine to de-schedule and disconnects that particular virtual machine 4, 5 from the accelerator 12 (step 26, FIG. 2) and saves its state to memory so that it can be reconnected at a later time in order to complete the task that had run idle (step 28, FIG. 2). The hypervisor 10 then connects the waiting virtual machine 4, 5 to the accelerator 12, via an input/output interface, so that it can submit its pending tasks to the accelerator 12 (step 28, FIG. 2).

The accelerator 12 continues to write out the scheduling statistics periodically to the circular memory buffer 14, incrementing the sequence number each time, and the hypervisor 10 continues to dynamically manage the connection of the virtual machines 4, 5 to the accelerator 12 so that the highest priority tasks are being run on the accelerator 12 at any given time.

The scheduling statistics are also used to determine the optimum DVFS (dynamic voltage and frequency scaling) point at which to operate the accelerator in order to minimise its power consumption. In particular, the information regarding usage of the accelerator by the virtual machines, i.e. the fraction of time a resource was used, may be used to control the frequency of the accelerator, thus affecting the future available capacity of the accelerator. The temperature of the accelerator and the frequency of other parts of the data processing system, for example, may also be used to influence the choice of frequency for the accelerator. For example, when the scheduling statistics show that the usage of the accelerator is low, the frequency can be reduced such that the accelerator still performs at an acceptable level, i.e. giving enough processing capacity to the virtual machines that are connected thereto, while minimising its power consumption.

It can be seen from the above that at least in some embodiments of the data processing system 1, the accelerator 12 periodically writes out scheduling statistics information to the circular memory buffer 14 without being prompted by hypervisor 10 for each instance, such that the scheduling statistics are provided upfront by the accelerator 12, where they can be read by the hypervisor 10 for use in allocating the input/output interfaces to the virtual machines 4, 5. The provision of the scheduling information is thus automatic for each instance of the one or more selected pieces of information being written out to the circular memory buffer 14.

By periodically writing out scheduling statistics to the circular memory buffer 14, which is accessible by at least the hypervisor 10 and the accelerator 12, these are available to the hypervisor 10 whenever it wants them and without waiting, i.e. the hypervisor 10 does not need to send a specific request to the accelerator 12 each time for this information. The technology described herein significantly reduces the time taken to obtain the scheduling information and thus gives a more efficient data processing system 1 compared to conventional systems which introduce a large latency when the hypervisor specifically requests and waits for the scheduling statistics to be provided by the accelerator.

Some embodiments, at least, therefore give a very efficient way of accessing the scheduling statistics, because the hypervisor 10 simply needs to read them from the circular memory buffer 14 and this greatly reduces the latency of this process, compared to the hypervisor 10 sending a request to the accelerator 12 for specific information and then waiting for the response. For example, the time taken in the present system to simply read the desired information from the circular memory buffer 14 will take of the order of 100 ns (compared to of the order of 100 µs in a conventional system), approximately three orders of magnitude quicker than was previously possible.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processing system that comprises:
   one or more processors that each execute one or more operating systems, each operating system including one or more applications;
   an accelerator that provides a shared resource for a plurality of the applications;
   one or more input/output interfaces for the submission of tasks to the accelerator;
   a hypervisor that manages the allocation of the input/output interfaces to the one or more operating systems; and
   a storage area accessible by the hypervisor and the accelerator;
   the method comprising:
   the accelerator periodically writing one or more pieces of information representative of one or more scheduling statistics of the accelerator to the storage area without having received a request for the one or more pieces of information from the hypervisor,
   wherein the one or more pieces of information representative of the accelerator's scheduling statistics comprise information related to overall use of the accelerator by the one or more operating systems connected thereto.

2. The method of operating the data processing system as claimed in claim 1, wherein the one or more pieces of information comprise fields and/or variables that are determined in advance and the same set of information is provided each time the one or more pieces of information are written out.

3. The method of operating the data processing system as claimed in claim 1, wherein the one or more pieces of information representative of the scheduling statistics are written out from the accelerator to the storage area at a regular interval.

4. The method of operating the data processing system as claimed in claim 1, the method further comprising detecting the occurrence of one or more particular events in the data processing system, and writing out the one or more pieces of scheduling information as a result of detecting the one or more particular events.

5. The method of operating the data processing system as claimed in claim 1, comprising writing the one or more pieces of information representative of one or more scheduling statistics of the accelerator to the storage area in such a way that the writing of the pieces of information to the storage area does not prevent the reading of stored scheduling statistics information from the storage area while the pieces of information are being written to the storage area.

6. The method of operating the data processing system as claimed in claim 5, wherein the step of periodically writing one or more pieces of information comprises writing out the next set of the one or more pieces of information to a different location in the storage area than the location to which the previous version of the one or more pieces of information was written out.

7. The method of operating the data processing system as claimed in claim 1, wherein the storage area comprises a circular memory buffer.

8. The method of operating the data processing system as claimed in claim 1, comprising the step of determining, using the hypervisor, if the one or more pieces of information have been updated.

9. The method of operating the data processing system as claimed in claim 1, wherein each set of the one or more pieces of information written out is associated with an identifier representative of its version.

10. The method of operating the data processing system as claimed in claim 1, comprising providing a time limit for the hypervisor to read the one or more pieces of scheduling information from the storage area.

11. The method of operating the data processing system as claimed in claim 1, wherein the one or more pieces of information representative of the accelerator's scheduling statistics comprise information related to each operating system connection to the accelerator.

12. A method of operating a data processing system that comprises:
one or more processors that each execute one or more operating systems, each operating system including one or more applications;
an accelerator that provides a shared resource for a plurality of the applications;
one or more input/output interfaces for the submission of tasks to the accelerator;
a hypervisor that manages the allocation of the input/output interfaces to the one or more operating systems; and
a storage area accessible by the hypervisor and the accelerator;
the method comprising:
the accelerator periodically writing one or more pieces of information representative of one or more scheduling statistics of the accelerator to the storage area, the writing process being such that the writing of the pieces of information to the storage area does not prevent the reading of stored scheduling statistics information from the storage area while the pieces of information are being written to the storage area,
wherein the one or more pieces of information representative of the accelerator's scheduling statistics comprise information related to overall use of the accelerator by the one or more operating systems connected thereto.

13. A data processing system comprising:
one or more processors that each execute one or more operating systems, each operating system including one or more applications;
an accelerator that provides a shared resource for a plurality of the applications;
one or more input/output interfaces for the submission of tasks to the accelerator;
a hypervisor that manages the allocation of the input/output interfaces to the one or more operating systems;
a storage area accessible by the hypervisor and the accelerator;
wherein the accelerator is capable of writing one or more pieces of information representative of one or more scheduling statistics of the accelerator periodically to the storage area without having received a request for the one or more pieces of information from the hypervisor,
wherein the one or more pieces of information representative of the accelerator's scheduling statistics comprise information related to overall use of the accelerator by the one or more operating systems connected thereto.

14. The data processing system as claimed in claim 13, wherein the pieces of information comprise fields and/or variables that are determined in advance and the same set of information is provided each time the one or more pieces of information are written out.

15. The data processing system as claimed in claim 13, wherein the accelerator is capable of writing out the one or more pieces of information representative of the scheduling statistics to the storage area at a regular interval.

16. The data processing system as claimed in claim 13, wherein the accelerator is capable of detecting the occurrence of one or more particular events in the data processing system, and writing out the one or more pieces of scheduling information as a result of the detection of the one or more particular events.

17. The data processing system as claimed in claim 13, wherein the accelerator is capable of writing the one or more pieces of information representative of one or more scheduling statistics of the accelerator periodically to the storage area in such a way that the writing of the pieces of information to the storage area does not prevent the reading of stored scheduling statistics information from the storage area while the pieces of information are being written to the storage area.

18. The data processing system as claimed in claim 17, wherein the accelerator is capable of writing out the next set of the one or more pieces of information to a different location in the storage area than the location to which the previous version of the one or more pieces of information was written out.

19. The data processing system as claimed in claim 13, wherein the storage area comprises a circular memory buffer.

20. The data processing system as claimed in claim 13, wherein the hypervisor is capable of determining if the one or more pieces of information have been updated.

21. The data processing system as claimed in claim 13, wherein each set of the one or more pieces of information written out is associated with an identifier representative of its version.

22. The data processing system as claimed in claim 13, wherein there is a time limit for the hypervisor to read the one or more pieces of scheduling information from the storage area.

23. The data processing system as claimed in claim 13, the one or more pieces of information representative of the accelerator's scheduling statistics comprise information related to each operating system connection to the accelerator.

24. A data processing system comprising:
one or more processors that each execute one or more operating systems, each operating system including one or more applications;
an accelerator that provides a shared resource for a plurality of the applications;
one or more input/output interfaces for the submission of tasks to the accelerator;
a hypervisor that manages the allocation of the input/output interfaces to the one or more operating systems;
a storage area accessible by the hypervisor and the accelerator;
wherein the accelerator is capable of writing one or more pieces of information representative of one or more scheduling statistics of the accelerator periodically to the storage area and in such a way that the writing of the pieces of information to the storage area does not prevent the reading of stored scheduling statistics information from the storage area while the pieces of information are being written to the storage area,
wherein the one or more pieces of information representative of the accelerator's scheduling statistics comprise information related to overall use of the accelerator by the one or more operating systems connected thereto.

25. A non-transitory computer readable storage medium storing computer software code which when executing on a processor performs a method of operating a data processing system that comprises: one or more processors that each execute one or more operating systems, each operating system including one or more applications;
an accelerator that provides a shared resource for a plurality of the applications;
one or more input/output interfaces for the submission of tasks to the accelerator;
a hypervisor that manages the allocation of the input/output interfaces to the one or more operating systems; and
a storage area accessible by the hypervisor and the accelerator;
the method comprising:
the accelerator periodically writing one or more pieces of information representative of one or more scheduling statistics of the accelerator to the storage area without having received a request for the one or more pieces of information from the hypervisor,
wherein the one or more pieces of information representative of the accelerator's scheduling statistics comprise information related to overall use of the accelerator by the one or more operating systems connected thereto.

26. A non-transitory computer readable storage medium storing computer software code which when executing on a processor performs a method of operating a data processing system that comprises: a plurality of operating systems that each execute one or more operating systems, each operating system including one or more applications;
an accelerator that provides a shared resource for a plurality of the applications;
one or more input/output interfaces for the submission of tasks to the accelerator;
a hypervisor that manages the allocation of the input/output interfaces to the one or more operating systems; and
a storage area accessible by the hypervisor and the accelerator;
the method comprising:
the accelerator periodically writing one or more pieces of information representative of one or more scheduling statistics of the accelerator to the storage area, the writing process being such that the writing of the pieces of information to the storage area does not prevent the reading of stored scheduling statistics information from the storage area while the pieces of information are being written to the storage area,
wherein the one or more pieces of information representative of the accelerator's scheduling statistics comprise information related to overall use of the accelerator by the one or more operating systems connected thereto.

* * * * *